United States Patent
Jensen et al.

(10) Patent No.: US 12,085,208 B2
(45) Date of Patent: Sep. 10, 2024

(54) FLUID LINE FOR CONNECTION WITH A COUPLING

(71) Applicant: TI Automotive (Fuldabrueck) GmbH, Fuldabrueck (DE)

(72) Inventors: Hans Jensen, Dettingen Unter Teck (DE); Uwe Fiedler, Hockenheim (DE)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 0 days.

(21) Appl. No.: 17/741,695

(22) Filed: May 11, 2022

(65) Prior Publication Data
US 2022/0364667 A1 Nov. 17, 2022

(30) Foreign Application Priority Data
May 14, 2021 (EP) ..................................... 21173854

(51) Int. Cl.
*F16L 37/127* (2006.01)
*H01M 10/613* (2014.01)
*H01M 10/625* (2014.01)
*H01M 10/6567* (2014.01)

(52) U.S. Cl.
CPC ......... *F16L 37/127* (2013.01); *H01M 10/613* (2015.04); *H01M 10/625* (2015.04); *H01M 10/6567* (2015.04); *H01M 2220/20* (2013.01)

(58) Field of Classification Search
CPC ..... F16L 37/121; F16L 37/122; F16L 37/127; F16L 37/133; F16L 37/16; F16L 37/18; F16L 37/20; F16L 37/24; F16L 37/244; F16L 37/248; F16L 37/252
See application file for complete search history.

(56) References Cited

U.S. PATENT DOCUMENTS

| 543,871 A * | 8/1895 | Houze | F16L 37/20 |
| | | | 285/344 |
| 2015/0306366 A1* | 10/2015 | Lewis | F16L 37/248 |
| | | | 29/428 |

FOREIGN PATENT DOCUMENTS

| DE | 960436 C | 3/1957 |
| DE | 2624521 A1 | 12/1976 |
| DE | 102016004069 A1 | 10/2017 |
| FR | 1435899 A | 4/1966 |
| JP | S5930995 U | 2/1984 |
| JP | 2011226546 A | 11/2011 |

* cited by examiner

*Primary Examiner* — Aaron M Dunwoody
(74) *Attorney, Agent, or Firm* — Dickinson Wright PLLC

(57) ABSTRACT

A fluid line for connection with an assembly of a motor vehicle includes a pipe and at least one connector. The connector is configured for insertion into a complementary coupling, and has a main body and a locking element for locking with the coupling. The locking element is mounted relative to the main body so that it can rotate around a rotational axis, and designed in such a way as to achieve a locking of the connector by rotating the locking element around the rotational axis. The locking element has at least one locking contour, and is designed in such a way that a force acting axially on the connector is exerted in the direction of the coupling by rotating the locking element during a locking process with a coupling.

19 Claims, 5 Drawing Sheets

FLUID LINE FOR CONNECTION WITH A COUPLING

RELATED APPLICATIONS

The present disclosure claims priority to and is a national phase application of European Application 21173854.7, filed on May 14, 2021, the entire contents of each of which are incorporated herein by reference.

FIELD

The present disclosure relates to a fluid line for connection with an assembly of a motor vehicle, comprising a tube or pipe and at least one connector, wherein the connector is designed for insertion into a complementary coupling, wherein the connector comprises a main body and a locking element for locking with the coupling, wherein the locking element is mounted relative to the main body so that it can rotate around a rotational axis D, wherein the connector or locking element is designed in such a way as to achieve a locking of the connector by rotating the locking element around the rotational axis D, wherein the locking element has a locking contour. The disclosure also relates to a fluid connection comprising this fluid line and a coupling, as well as to an application of this fluid line and this fluid connection.

BACKGROUND

Such a fluid connection is known from DE 41 29 397 C1, and comprises a coupling of an assembly, exterior sections of which have continuous grooves. These grooves serve to receive corresponding hooks of a locking element of the connector. This locking element is rotatably mounted on the connector, so that it can be engaged like a bayonet with the grooves of the coupling.

This fluid connection and probably all known fluid connections comprise at least one seal in the form of one or two elastic sealing rings, which are arranged in a radial direction between a connector shaft of the connector and an inner wall of the coupling. The sealing rings can be inserted both on the connector and in the coupling. The larger the clamping forces that here act on the sealing rings, the more effective the sealing effect of the sealing rings. However, this also increases the forces to be applied in the axial direction, so as to completely insert the connector into the coupling.

In terms of their diameters, the sealing ring, connector, and coupling are precisely matched with tolerances of approx. 0.1 mm and even less. If the coupling turns out to be even slightly too big, or the sealing ring or connector slightly too small, the fluid connection will not be tight. In the reverse case, excessively high axial forces arise. These can complicate putting together an individual fluid connection, which significantly diminishes the qualitative impression of the fluid connection.

In light of the low tolerances for the diameters, the fluid line manufacturer supplies the manufacturer of the assembly or overall system (e.g., a vehicle manufacturer) with an adapter, which comprises an interface for the remainder of the assembly at one end, and is designed precisely complementary to the fluid line at the other end. The interface can be designed as desired, and, for example, be welded, bonded, press fit and/or bolted. The adapter thus permits an optimal plug connection on the one hand, but literally generates an additional expenditure in the form of the interface on the other.

Therefore, the disadvantage to known fluid connections with assemblies is that the production cost is too high with respect to the assemblies. As a consequence, a technical problem of the present disclosure is to reduce the production cost with respect to the assemblies. The technical problem is preferably to economize on the adapter, thereby eliminating the production cost for the adapter interface.

BRIEF SUMMARY

This task is resolved by a fluid line for connection with an assembly or another fluid line of a motor vehicle, wherein the fluid line comprises a tube or pipe and at least one connector, wherein the connector is designed for insertion into a complementary coupling of the assembly or the other fluid line, wherein the connector has a main body, wherein the main body comprises a first end allocated to the coupling, and a second end facing away from the first end, wherein the first end and second end are connected with each other by a fluid channel, wherein the fluid channel has an axis A and defines an axial and a radial direction, wherein the second end is a component part of a connecting section of the main body, wherein the connecting section is connected with the tube, wherein the connector comprises a locking element for locking with the coupling, wherein the locking element is mounted relative to the main body so that it can rotate around a rotational axis D, wherein the connector and/or locking element is designed in such a way as to achieve a locking of the connector by rotating the locking element around the rotational axis D, wherein the locking element has at least one locking contour, wherein the locking element is designed in such a way that a force acting axially on the connector can be exerted in the direction of the coupling by rotating the locking element during a locking process with a coupling.

The solution according to the present disclosure is initially based upon the knowledge that changing the coupling and connector is essential for achieving the problem mentioned at the outset. The background is that precise inner diameters are easier to produce than precise outer diameters. While a precise inner diameter is comparatively easy to set by drilling or redrilling, this does not hold true for outer diameters. As a consequence, it is essential for resolving the problem mentioned at the outset that the connector be allocated to the fluid line, and the coupling to the assembly. In particular, this eliminates the previous need to provide an adapter for purposes of seal precision, which at the same time also obviates the interface between the adapter and assembly. The disclosure is further based upon the knowledge that allocating the movable locking element to the connector likewise reduces the outlay in relation to the assembly. This is because the work steps at the factory involving allocation and assembly of the movable locking element on the assembly are eliminated as a result.

Finally, the present disclosure is based upon the knowledge that the rotatability of the locking element enables the exertion of a larger axial force on the connector in the locking process than is possible by exerting the force in an axial direction. It was found that less precise tolerances are then required between a receiving area of the coupling and the connector. This is because the large axial forces that can be exerted given rotatable locking elements makes it possible to downwardly expand the range of permissible inner diameters for the coupling, since the larger forces that arise on the seal can be more easily applied by the locking element. As a result, boreholes in the coupling are also not absolutely required, so that the production cost relative to assemblies can essentially be confined to casting or injection molding the couplings out of metal or plastic. This resolves the problem mentioned at the outset.

The term "fluid line" preferably refers to a tube or pipe with at least one connector, and expediently with two connectors, wherein a respective connector is preferably arranged at each end of the pipe. It is expedient that at least one of the two connectors be designed for insertion into a complementary coupling. The term "assembly" is advantageously a collective term that comprises all non-fluid line components. Involved in the case of assemblies, for example, are tanks, injection nozzles, battery modules, pumps, heat exchangers and the like. The term "coupling" preferably refers to a female plug element. The connector for insertion into a complementary coupling is expediently a male plug element.

The tube preferably comprises plastic. It is preferred that the tube or pipe be a multilayer tube. The tube advantageously comprises at least two or three or four plastic layers. The plastic of the tube or a tube layer can be polyamide, for example. The connector or main body or locking element can have plastic and/or metal. The connector or main body or locking element is preferably comprised only of plastic. It is preferred that the coupling have plastic and/or metal. The main body and/or locking element and/or coupling is advantageously irreversibly one-piece, preferably integral in design, or manufactured out of a casting/injection molding.

The main body can be rotationally symmetrical in design. According to an exemplary embodiment, the main body is rotationally symmetrical in design, with the exception of arrangement elements for the locking element. It is preferred that the fluid line and coupling be component parts of a fluid connection. The term "locking" preferably means that the fluid connection is fluid tight in a locked state. By contrast, the fluid connection is in an open state if the connector has not been introduced into the coupling. The fluid connection is in an intermediate state when neither the open nor the locked state is present. The term "wherein the connector is designed for insertion into a complementary coupling" preferably refers only to the connector being suitable for this purpose. In particular, this term does not mean that the coupling is to be regarded as a component part of the fluid line. Instead, the coupling is a component part of the fluid connection.

It is preferred that the coupling have at least one locking part and preferably two locking parts, and further preferably have only two locking parts. It is very preferred that the at least one locking part be rigidly arranged on the coupling. It is preferred that the at least one locking part be located on an exterior side of the coupling. It is best that at least sections of the exterior side of the coupling be cylindrically designed in an axial direction. It is very preferred that at least one locking part protrude outwardly in a radial direction in relation to the preferably cylindrical exterior side of the coupling. In an especially preferred embodiment, the at least one locking part is designed as a pin. The pin can have a rounded cross section, and preferably be circular in design.

It is preferred that a radial expansion of the locking part proceeding from the exterior side of the coupling measure at least 1 mm, and preferably at least 2 mm. The radial expansion of the at least one locking part advantageously corresponds to at most 5 mm, and preferably to at most 4 mm. It is very especially preferred that the locking parts have angular distances that are identical to each other in the circumferential direction.

The locking element is advantageously designed in such a way that a preferably manually performed rotation of the locking element during a locking process with the coupling is converted into a force that acts axially on the connector. It is very advantageous that the lock be achievable only by rotating the locking element. It is preferred that the connector or locking element be designed in such a way that the rotation of the locking element is converted into an axial movement of the connector, wherein the axial movement of the connector preferably corresponds to a last, axial path section of the connector into the coupling.

According to a very preferred embodiment, the locking contour defines a movable locking path for a preferably rigid locking part of the coupling. It is preferred that the connector or coupling or locking element or locking part be designed in such a way that the locking contour is moved over at least a section of its length along the allocated locking part during the rotation of the locking element. The locking path or locking contour is preferably designed in such a way that it converts a rotational movement of the locking element into an axial movement of the connector. The locking contour or locking path expediently has a starting point, at which the locking part comes into contact with the locking path or locking contour for the first time during the rotation for locking purposes. It is preferred that the locking contour or locking path comprise a locking point. The locking element is preferably designed in such a way that the axial movement of the connector into the coupling has concluded once the locking point of the locking part has been reached. It is very preferred that the locking point comprise one end of the locking path.

According to an especially advantageous embodiment, the locking contour is designed in such a way that the necessary exertion of force while locking the locking element initially rises and then falls, so that locking process preferably involves latching in the locking element. It is very preferred that the locking point be further away from the second end of the main body in an axial direction than a section of the locking path lying in front of it. A section of the locking path between the starting point and the locking point in an axial direction and in the locked state is preferably arranged closer to the second end of the main body than all other sections of the locking path. The starting point of the locking path is advantageously the point or section of the locking path located the farthest away from the second end of the main body in an axial direction. In particular during the locked state, it is very preferred that the locking point be arranged in an axial direction between the starting point and the section of the locking path closest to the second end of the main body.

It is preferred that the locking path extend over at least 5 mm, and preferably over at least 7 mm. It is possible that the locking contour have an edge, and preferably only one edge, which defines the locking path. According to one exemplary embodiment, the locking contour comprises two edges, which define the locking path. It is preferred that the two edges of the locking contour run parallel to each other. It is expedient that distance between the two edges be larger than a diameter or expansion of the locking part between the two edges.

It is especially advantageous that the connector be drawn in an axial direction toward the coupling during rotation in the locking process by at least 1 mm or 2 mm or 3 mm. It is advantageous that an expansion of the locking contour in an axial direction or of the locking path measure at least 1 mm or 2 mm or 3 mm. It is preferred that the locking contour or locking path be longer than an expansion of the locking part in the direction of the locking contour or locking path. It is advantageous that the locking point be designed to receive a locking part of the coupling. It is expedient that a locking part received in the locking point define a locked state. It is very preferred that the locking element or locking contour only be designed in such a way that a force threshold must be overcome in order to transfer into the locked state and/or exit the locked state.

According to a preferred embodiment, the locking contour comprises at least one locking point, wherein the locking element is preferably designed in such a way that the locking part is visible or completely visible in the locking point. It is best that the locking element envelop the main body or a/the stop at least along an axial section and over at least one section in the circumferential direction. It is preferred that the locking element be arranged on an exterior side of the main body. The locking element advantageously has a recess, so that the locking part is visible or completely visible during the locking process. For example, the recess can be windowlike in design, in particular with an oblong shape. The recess can be defined by a single edge, for example by an edge of the swiveling arm. The advantage to having the locking part be visible while locking, and in particular during rotation in the locking process, lies in the fact that the user can observe the locking progress.

It is especially preferred that the connector and/or locking element comprise a display element for displaying the complete locking process, wherein the display element preferably comprises a stop of the locking contour and/or a display symbol. According to a preferred embodiment, the stop of the locking contour ends the locking path. The stop of the locking contour preferably defines the locking point. The stop of the locking contour advantageously forms a wall of the locking contour or a wall of the end of the locking path. It is especially preferred that the display element or the stop of the locking contour be visible to the user during the locking process. It is advantageous that the connector be designed in such a way that the locking part is in the locking point in a locked state of the connector.

It is very preferred that the display symbol be optically recognizable to the user. The display symbol can be applied or pressed or embossed or bonded onto the connector or main body. For example, the display symbol can be designed as a barcode or QR code. According to other embodiments, the display symbol can be arranged on the connector or on the main body as a green or red point, for example. It is especially preferred that the connector or main body or locking element be designed in such a way that the display symbol is at least partially covered by the locking element either only in the locked position or only in the open position. It is especially advantageous that the display symbol be at least partially covered by the locking element in the open position of the locking element, and be covered by the locking element to less of an extent or not at all in the locked position. For example, the display symbol can be arranged on a/the stop of the main body or on an exterior side of the stop of the main body. It is preferred that the connector be designed in such a way that, if a/the actuating section of the locking element is visible, the display symbol is also visible in the locked position or in the open position of the locking element.

The locking element especially preferably comprises an actuating section for performing the locking or rotating the locking element during the locking process. It is very preferred that the actuating section of the locking element be arranged in the axial half of the locking element that faces away from the first end of the main body. The actuating section can be activated in a radial or circumferential direction. It is expedient that the actuating section be designed for actuation by hand. For example, the actuating section can comprise a projection and/or a nonslip surface. It is possible that the actuating section be designed as a hook or like a locking screw. It is very preferred that the locking contour be arranged between a coupling-side end of the locking element and the actuating section.

According to a very preferred embodiment, the connector or main body has a stop, preferably a stop flange. It is preferred that the stop extend in a radial direction or protrude in a radial direction relative to an exterior side of the main body. The stop or stop flange is especially preferably at least sectionally and further preferably completely circumferential in design. The stop preferably has a radial expansion of at least 1/2/3 mm. It is expedient that the stop have an axial expansion of at least 1/2/3 mm. It is preferred that the stop be arranged in a central half of the axial expansion of the main body. It is advantageous that the main body have the connecting section and a connector shaft in an axial direction. It is expedient that the stop divide the main body into the connecting section and into a connector shaft in the axial direction. The connector shaft advantageously corresponds to the axial section of the main body that can be inserted into the coupling. It is preferred that a/the connector shaft be located between the stop and the first end of the main body in an axial direction. It is advantageous that the connecting section be arranged between the second end of the main body and the stop of the main body. It is preferred that the axial expansion of the connector shaft be larger than that of the connecting section.

The connector advantageously comprises a seal. The seal is preferably designed as a sealing ring. It is best that the seal comprise an elastic plastic. The seal advantageously comprises an annular groove. The seal or sealing ring or ring groove is preferably arranged on the connector shaft or on an exterior side of the connector shaft or connector or main body. It is expedient that the sealing ring be inserted into the annular groove. The connector shaft or main body preferably comprises a middle section and/or an end section. It is preferred that the middle section be arranged in an axial direction between the seal and the stop of the main body. The seal advantageously divides the connector shaft in an axial direction into a/the end section and into a/the middle section. It is expedient that the end section be arranged in an axial direction between the seal and the first end of the main body. It is preferred that the end section and/or middle section have an axial length of at least 2/3/4 mm.

It is very advantageous that an axial length of the locking element correspond to at least 50/60/70/80% of the axial length of the main body. As a result, the locking element can be better actuated manually. For example, in the case of a bayonetlike locking element, a/the actuating section of the locking element can be spaced axially further apart from the locking contour or locking part or assembly, so that one hand can better actuate the locking element. This holds true in particular for assemblies that have a wall perpendicular to axis A, and correspondingly limit the freedom of movement of the hand. In another exemplary embodiment, a large axial length of the locking element leads to a lever length of an/the actuating section becoming larger, so that correspondingly larger forces can act on the locking contour or locking part. The main body is preferably at least 15/20/25/30 mm long. It is expedient that the main body have an axial length of at most 100/80/60 mm. It is preferred that the locking element protrude over a/the seal in an axial direction toward the coupling in a locked state and/or in an open state. It is preferred that the locking element protrude over a/the stop of the main body in an axial direction toward the second end or the tube in an open and/or a locked position.

It is preferred that the axial expansion of a section insertable into the coupling or the connector shaft of the main body correspond to at least 20%/30%/40%/50% of the entire axial length of the main body. As a result, the form closure that arises between the main body and coupling is formed in a radial direction over a larger, axial stretch, thereby improving the mechanical stability of the fluid connection overall.

According to an embodiment, the rotational axis D of the locking element runs in an axial or essentially axial direction or parallel to axis A. It is preferred that the locking element be designed as a bayonetlike sleeve. It is advantageous that the actuation section of the locking element be designed so as to run around the main body at least sectionally, and preferably completely. For example, the actuating section can be designed in the form of the head of a locking screw. It is preferred that the actuating section be arranged at the axial end of the locking element that faces away from the first end of the main body or is allocated to the second end of the main body. It is very advantageous that the actuating section have a shoulder that projects radially inward. It is especially preferred that the radially inwardly protruding shoulder of the actuating section or of the locking element or of the main body be designed in such a way that the shoulder abuts against the stop of the main body in a locked position of the connector in an axial direction, and preferably exerts a force on the directional coupling in the axial direction. In the locked position, it is best that an axial interior side of the shoulder abut against a wall of the stop that faces the second end of the main body. It is preferred that the shoulder of the actuating section run around the connecting section of the main body and/or around an end of the tube at least sectionally in the circumferential direction, and preferably completely in the circumferential direction.

It is advantageous that the locking element have a reinforcement at a coupling-side end. The reinforcement can be designed as an at least partially and preferably completely circumferential collar. The locking contour is advantageously arranged between the coupling-side end or reinforcement and the actuating section. It is especially preferred that the locking contour be located in a wall of the locking element. It is very preferred that the locking contour at least sectionally break through the wall of the locking element. The locking contour in the wall of the locking element advantageously runs in roughly a spiral direction. It is very preferred that the locking part be visible owing to the breakthrough in the wall of the locking element.

According to an embodiment, the rotational axis D of the locking element in a top view of the connector runs at an inclination and preferably perpendicular to axis A, and in particular in a radial or essentially radial direction. It is very preferred that the locking element be designed like a lever that can be swiveled around the rotational axis D. The locking element preferably comprises at least one swiveling arm, and preferably two swiveling arms. The at least one swiveling arm advantageously has the locking contour. It is advantageous that the rotational axis of two opposing swiveling pins, in particular diametrically opposing swiveling pins, be formed on the exterior side of the main body.

It is very preferred that the swiveling pins be arranged on an exterior side of the stop. According to an embodiment, the swiveling pins are arranged on an interior side of the locking element, and engage into corresponding recesses on the exterior side of the main body.

It is advantageous that the actuating section be designed to be actuated in roughly the radial direction toward the connecting section. The actuating section is preferably designed in such a way as to enable a detachment of the locked locking element. In particular, the actuating section can be designed as a hook, which projects radially outward in the locked position. It is very preferred that the rotational axis D be arranged in an axial direction between the actuating section and swiveling arm or swiveling arms or locking contour or locking contours. In an exemplary embodiment, the locking contour is formed via an inner side or the inner edge of the swiveling arm that faces the rotational axis D or actuating section. It is preferred that the swiveling arm be roughly L-shaped in design.

The locking element advantageously comprises at least one latching leg and preferably two latching legs. The latching leg(s) advantageously latch(es) into the locked position at one end of the tube on the connecting section. The latching leg or latching legs is/are preferably designed in such a way as to abut upon one end of the tube or against the connecting section in the open position, so that the actuating section can only be moved further in the direction of the connecting section through the exertion of force. According to an especially preferred embodiment, a/the display symbol is arranged on the main body or on an exterior side of the stop. It is very preferred that the lever-like locking element at least partially cover the display symbol in an open position. In the locked position, it is expedient that the locking element at least partially uncover the display symbol.

The problem mentioned at the outset is resolved by a fluid connection that comprises a coupling and a fluid line according to the disclosure, wherein the connector of the fluid line is inserted or can be inserted into the coupling. The coupling can be a component part of an assembly or some other fluid line. It is expedient that the coupling have a front end that faces the connector or main body or stop of the main body. The coupling preferably has a sealing section and/or an end receptacle in the axial direction. In terms of its inner diameter, it is expedient that the sealing section be designed to receive the seal of the connector in a fluid-tight manner. The end receptacle of the coupling is preferably designed to enter into a form closure with the end section of the connector in a radial direction. It is very preferred that an inner diameter of the sealing section be larger than an inner diameter of the end receptacle. It is expedient that the coupling or assembly or other fluid line have a connecting channel. The end receptacle is advantageously arranged in an axial direction between the sealing section and connecting channel. The sealing section and/or end receptacle and/or connecting channel are preferably designed concentric to axis A. It is advantageous that an inner diameter of the connecting channel be smaller than that of the end receptacle, and preferably correspond to the inner diameter of the fluid channel of the connector. The coupling can have plastic and/or metal.

The task mentioned at the outset is resolved by using the fluid line according to the disclosure or fluid connection according to the disclosure in a motor vehicle, preferably in a battery module or for connection with a battery module. It is very preferred that the fluid line or fluid connector can be used in a vehicle with an electric drive. It is preferred that the fluid line or fluid connection be used in a coolant circuit.

BRIEF DESCRIPTION OF THE DRAWINGS

The disclosure will be described below based upon figures for two exemplary embodiments. Schematically shown on.

DETAILED DESCRIPTION

Figure 1:
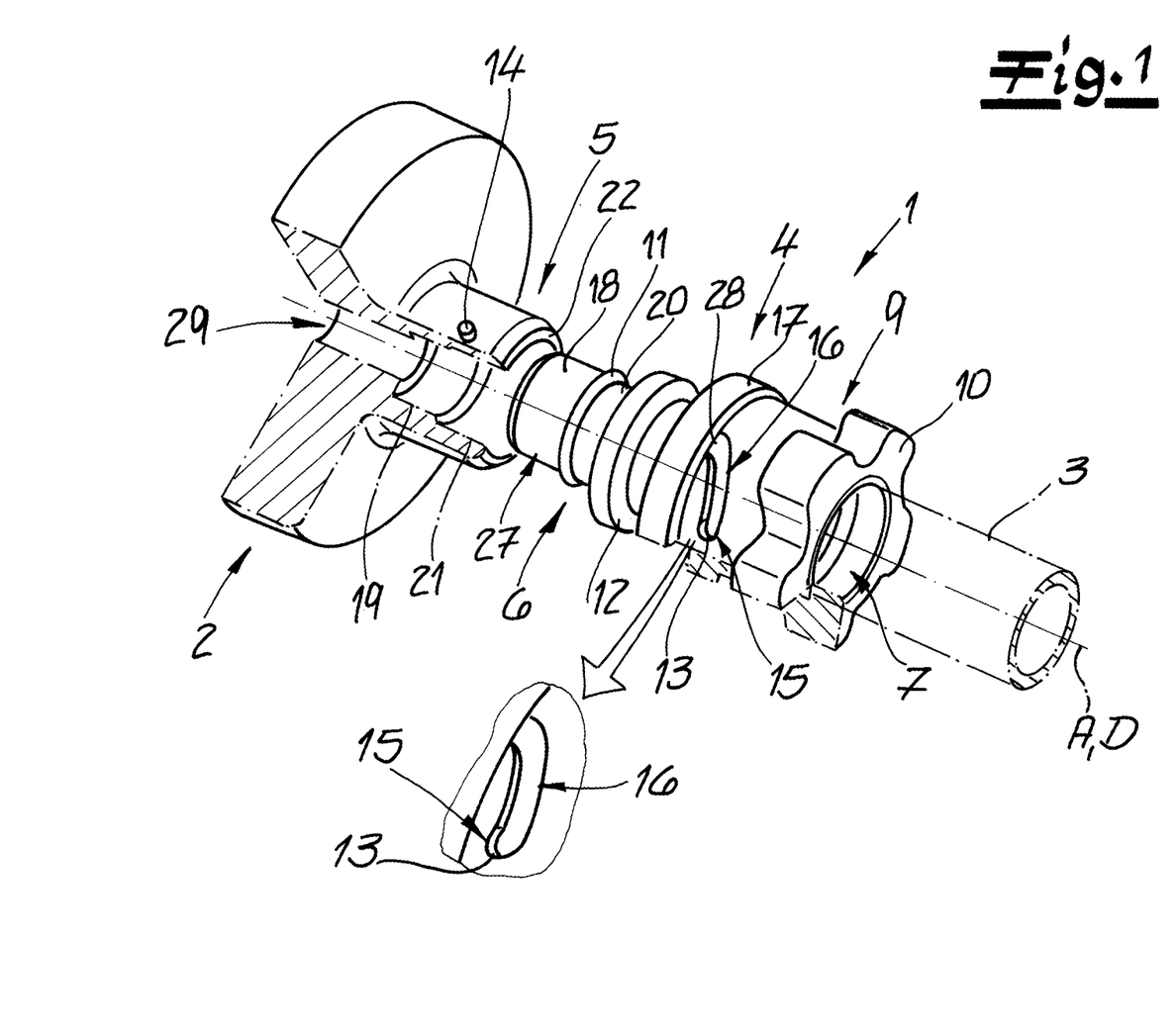
FIG. 1 is a perspective view of a first exemplary embodiment according to the disclosure.

Shown on FIG. 1 is a first exemplary embodiment of a connector 4 according to the disclosure. The connector 4 comprises a main body 6 as well as a locking element 9, which in this exemplary embodiment is bayonetlike in design. The main body 6 and locking element 9 are preferably separately designed elements. The main body 6 and/or locking element 9 is/are (each) preferably one-piece or integral in design. The connector 4 is a component part of a fluid line 1, which apart from the connector 4 in particular has a tube 3 as well. The tube 3 is connected with the connector 4, as will be illustrated in somewhat more detail later. The connector 4 or main body 6 has a preferably cylindrically designed fluid channel 7. The fluid channel 7 or main body 6 defines an axis A, which preferably is a rotational axis or a longitudinal axis of the main body 6. It is expedient that the fluid channel 7 connect a first end of the connector 4 or main body 6 facing the coupling 5 with a second end of the main body 6 facing away from the first end. The second end of the main body 6 facing away from the first is preferably a component part of a connecting section 8. The connecting section 8 in this exemplary embodiment preferably has a fluted surface on its exterior side, so that the mounted tube 3 is better held on the main body 6 or connecting section 8. The tube 3 is preferably held on an exterior side of the main body 6 through force closure. In other exemplary embodiments, however, the tube 3 can also be inserted into a hollow-cylindrical receptacle of a main body not illustrated here, and connected with the main body, for example by welding, in particular by laser welding.

The connector 4 is designed to be connected to a fluid connection 3, 4, 5 with a complementary counter-piece in the form of a coupling 5. The coupling 5 can be a component part of an assembly 2, for example which can be a tank, an injection nozzle, a battery module, or some other non-fluid line component. While the assembly 2 beyond the coupling 5 is designed as a flat cylinder in the present figures, it is to be understood solely as a cutout or symbolic design for assembly 2 of all kinds. In other exemplary embodiments, however, the coupling 5 can also be a component part of a second fluid line, so that the fluid connections according to the disclosure can in particular also comprise the connection of two tubes 3. The exterior side of the coupling 5 in this exemplary embodiment has two diametrically opposed locking parts 14 in the form of radially outwardly protruding pins. It is expedient that the coupling 5 be bounded by a front end 22 in the direction of the fluid line 1. The coupling 5 is advantageously designed in such a way as to have a receiving space for receiving the connector 4 or main body 6.

The main body 6 preferably comprises a stop 12, which further preferably is designed as a stop flange. The stop flange is advantageously designed as an element that circulates completely in the circumferential direction. The stop 12 preferably divides the main body 6 in an axial direction into the connecting section 8 (see FIG. 2) and a connector shaft 27. It is preferred that the connector 4 have a seal 11, which is preferably designed as an elastic sealing ring. It is expedient that the connector shaft 27 comprise a circumferential annular groove, into which the seal 11 is placed. The seal 11 can divide the connector shaft 27 or main body 6 in an axial direction into an end section 18 and middle section 20.

The locking element 9 in this exemplary embodiment is designed like a sleeve in the form of a surrounding element. At an axial section allocated to the second end of the main body 6, the locking element 9 preferably comprises an actuating section 10, which in this exemplary embodiment resembles the head of a locking screw. A reinforcement 17, for example in the form of a continuous collar, of the locking element 9 is advantageously located at an axial section of the locking element 9 allocated to the first end of the main body 6. The locking element 9 is preferably rotatably mounted on the main body 6, and defines a rotational axis D parallel to axis A (see FIG. 2). The locking element 9 preferably has at least one locking contour 16, which in this exemplary embodiment is configured as an oblong recess in a wall of the sleeve-like locking element 9. The locking element 9 advantageously comprises two—preferably identical—locking contours 16 that lie diametrically opposite each other relative to axis A. It is expedient that the at least one locking contour 16 be designed to receive the locking part 14 of the coupling 5 allocated thereto, so that the locking part 14 relative to the locking element 9 is moved along the locking contour 16. In this exemplary embodiment, however, it is expedient that the locking part 14 not be moved, but rather that the locking element 9 be actuated using the actuating section 10, so that the locking element 9 is rotated around the rotational axis D with the locking contour 16. Nonetheless, the locking part 14 moves relative to the locking contour 16.

The locking contour 16 has a starting point 28, which during insertion of the connector 4 comes into contact with the locking part 14 of the coupling 5 first. Rotating the locking element 9 causes the locking part 14 to ultimately arrive at a locking point 15 of the locking contour 16, wherein the locking contour 16 preferably defines a movable locking path for the preferably rigidly designed locking part. The locking path or locking contour 16 is advantageously designed in such a way as to exert an axial force on the connector 4 that acts in the direction of the coupling 5 during rotation of the locking element 9. The locking contour 16 of this exemplary embodiment is sectionally spiral in design.

The locking point 15 is preferably characterized in that it is arranged slightly closer to the coupling in an axial direction in comparison to the preceding piece of the locking contour 16. As a result, the axial forces acting on the locking contour 16 and locking part 14 taper off, so that the locking effect is especially advantageously achieved in the form of latching. It is most preferred that the locking point 15 have a display element 13 in the form of a stop. In this way, the locking part 14 cannot be moved further in relation to the locking contour 16 than up to the locking point 15. Based on the display element 13 in the form of the stop, the user recognizes at first glance that the locking process has been completely implemented.

Figure 2:
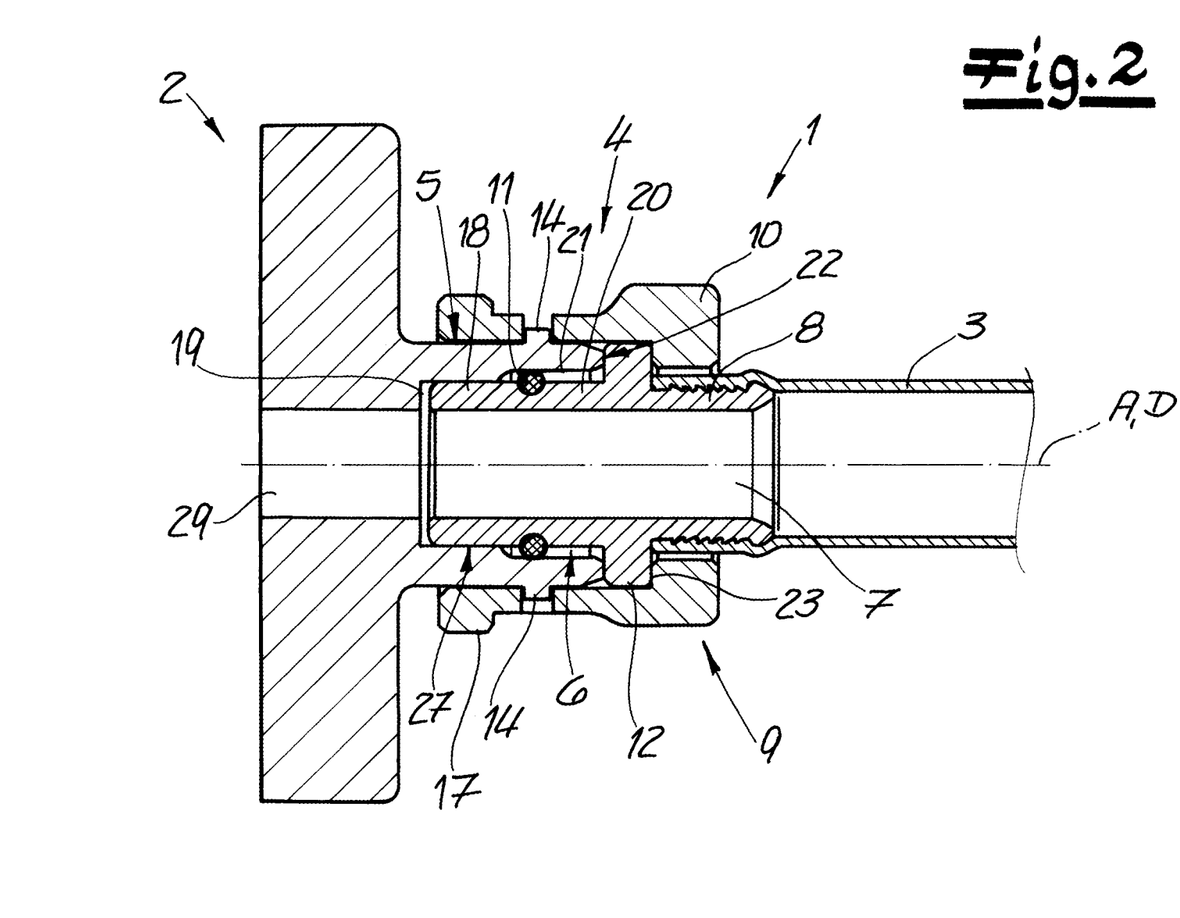
FIG. 2 is a longitudinal section of the exemplary embodiment from FIG. 1.

At the same time, the coupling 5 and connector 4 are preferably designed in such a way according to FIG. 2 that the front end 22 of the coupling 5 hits the stop 12 of the connector 4 or main body 6 in the locked position. An axially acting force of a shoulder 23 of the locking element 9 here preferably acts on the stop 12, thereby pressing the latter against the front end 22 of the coupling 5. Given the by far quite large force closure between the seal 11 and sealing section 21, a correspondingly large axial force must be overcome during insertion of the connector 4 into the coupling 5. The locking contour 16 is preferably designed in such a way that rotating the locking element 9 tangibly diminishes the force to be manually applied for the last, axial path piece up to complete locking. As a consequence, the force closure between the seal 11 and sealing section 21 can be given a rather large design.

The longitudinal section of the fluid connection 1, 2 comprised of the fluid line 1 and assembly 2 on FIG. 2 shows the fluid connection 1, 2 in a locked position. The end section 18 of the main body 6 is then preferably located in an end receptacle 19 of the coupling 5. The end section 18 is advantageously positively arranged in the end receptacle in a radial direction. It is expedient that the seal 11 in conjunction with a sealing section 21 of the coupling 5 likewise generate a form closure and preferably a sealing force closure in a radial direction. The inner diameter of the sealing section 21 is advantageously larger than the inner diameter of the end receptacle 19. It is preferred that a connecting channel 29 follow the end receptacle 19 in an axial direction toward the assembly 2. The inner diameter of the connecting channel 29 is advantageously smaller than the inner diameter of the end receptacle 19. It lies within the framework of the disclosure that an inner diameter of the connecting channel 29 correspond to an inner diameter of the main body 6 or an outer diameter of the fluid channel 7, which in particular avoids turbulences of the flowing medium. It is best that axis A be identical to an axis of the connecting channel 29 or the tube 3 on the connecting section 8.

As readily discernible in particular as relates to FIG. 2, the coupling 5 or assembly 2 has a structural design that is preferably stepped with respect to the inner diameter. It is especially preferred that the inner diameter of the sealing section 21, end receptacle 19 and connecting channel 29 gradually decrease in the direction of the interior of the assembly 2. As a rule, the assemblies 2 involve workpieces made out of plastic or metal, which are manufactured through injection molding or in a casting process, and have correspondingly large tolerances. However, the large tolerances that also arise for the inner diameters can be avoided very easily from the standpoint of production technology, in particular by refining the areas of the end receptacle 19 and sealing section 21 by means of drilling or vertical drilling. This yields perfect form closures between the end receptacle 19 and end section 18. In like manner, an ideal force closure is generated between the seal 11 and sealing section 21.

Alternatively, the manufacturer of the assembly 2 can also forgo the redrilling step, as a result of which larger tolerances must be accepted. These tolerances can then be dimensioned in such a way that the inner diameter of the sealing section 21 in some cases is so large that the sealing element 11 is sealed just enough, while in other cases exceptionally large force closures arise owing to inner diameters of the sealing section 21 that are a bit too small. However, these large force closures can be accepted, because the rotation of the locking element 9 tangibly reduces the expended force for the last, axial path piece during insertion of the connector 4.

Figure 3:
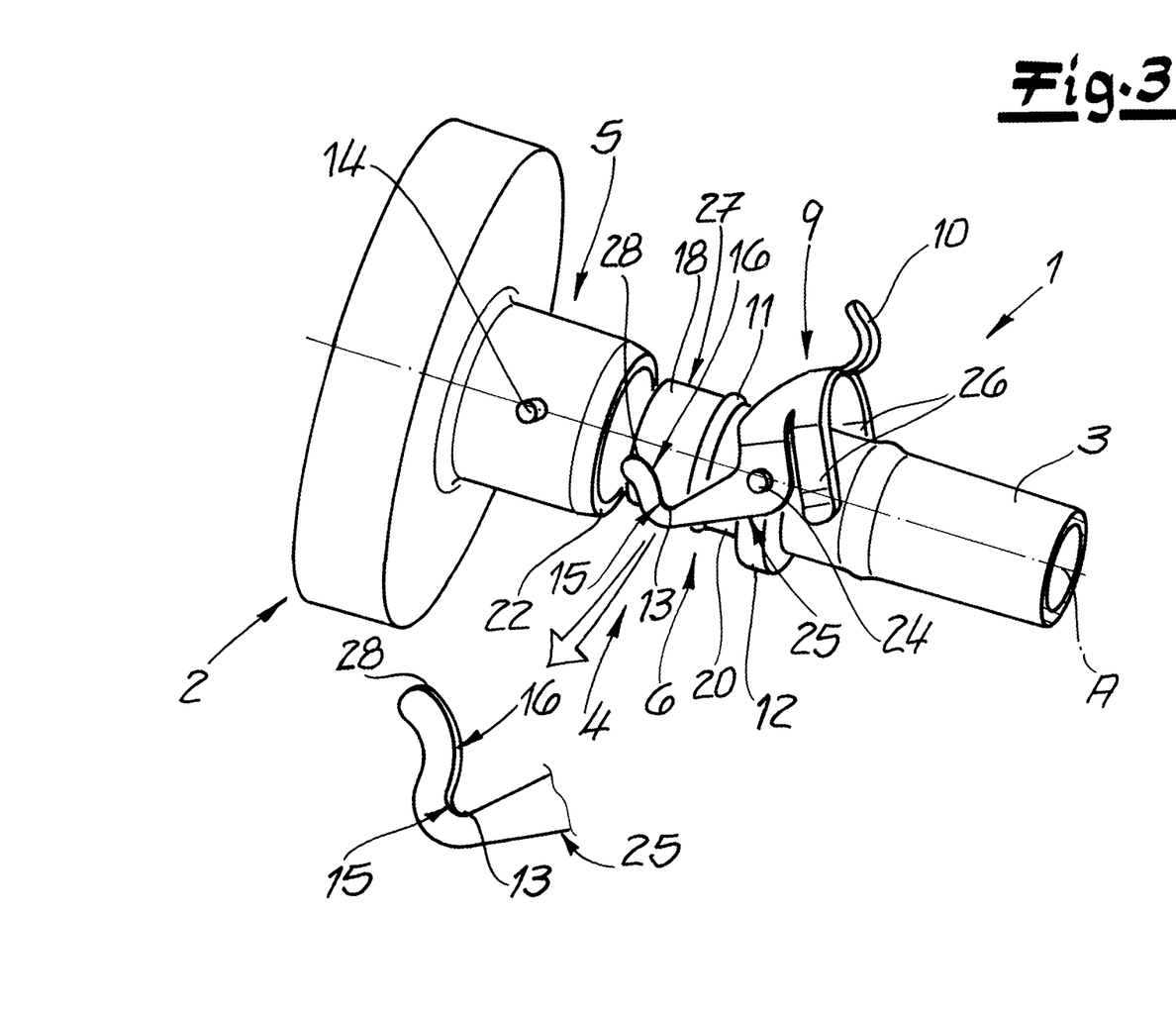
FIG. 3 is a perspective view of a second exemplary embodiment according to the disclosure.

FIG. 3 shows a second exemplary embodiment of the connector 4 according to the disclosure. In this second exemplary embodiment, the assembly 2, tube 3 and seal 11 are identical in design to the first exemplary embodiment. The main body 6 is also nearly identical in design to the main body of the first exemplary embodiment, and differs only in terms of the attachment of the locking element 9 with a completely different configuration. As a consequence, the main body 6 of the second exemplary embodiment comprises two diametrically opposing, radially outwardly protruding swiveling pins 24. In the present exemplary embodiment, the swiveling pins 24 are arranged on the stop 12, and define a rotational axis D of the locking element 9. The rotational axis D of the second exemplary embodiment is thus no longer parallel to axis A, but rather aligned perpendicular thereto, see FIG. 4.

According to FIG. 3, the locking element 9 has two swiveling arms 25 lying opposite each other in relation to axis A, which are mounted by way of the swiveling pins 24 so that they can swivel around the rotational axis D. The locking element 9 can be rotated around the rotational axis D by means of an actuating section 10, for example in the form of a hook. The locking element 9 of this exemplary embodiment comprises two latching legs 26, which latch the tube 3 in place during actuation of the locking element 9. Each swiveling arm 25 of the second exemplary embodiment advantageously comprises a locking contour 16, which expediently has a starting point 28, and advantageously also a locking point 15. It is preferred that the locking point 15 comprise a display element 13, which in this exemplary embodiment is designed as a stop for the locking part 14.

In order to connect the assembly 2 with the fluid line 1, the connector 4 is pushed into the coupling 5. Until that time, the latching legs 26 preferably abut against the tube 3, so that the latching legs 26 on FIG. 3 cannot slip downwardly, and the locking element 9 remains in an open position. The connector 4 is pushed into the coupling 5 either up to the stop 12, or until the resistance owing to the force closure of the seal 11 with the sealing section 21 becomes too large, without the front end 22 of the coupling 5 hitting the stop 12. The locking element 9 is then actuated via the actuating section 10. In the second case, when the locking element 9 is swiveled through actuation on the actuating section 10, the locking contours 16 generate a force along the locking parts 14 that axially acts on the connector 4. This forced draws the connector 4 into the coupling 5 until the front end 22 hits the stop 12. The user can detect that locking is complete by when the locking part 14 hits the display element 13.

Figure 4:
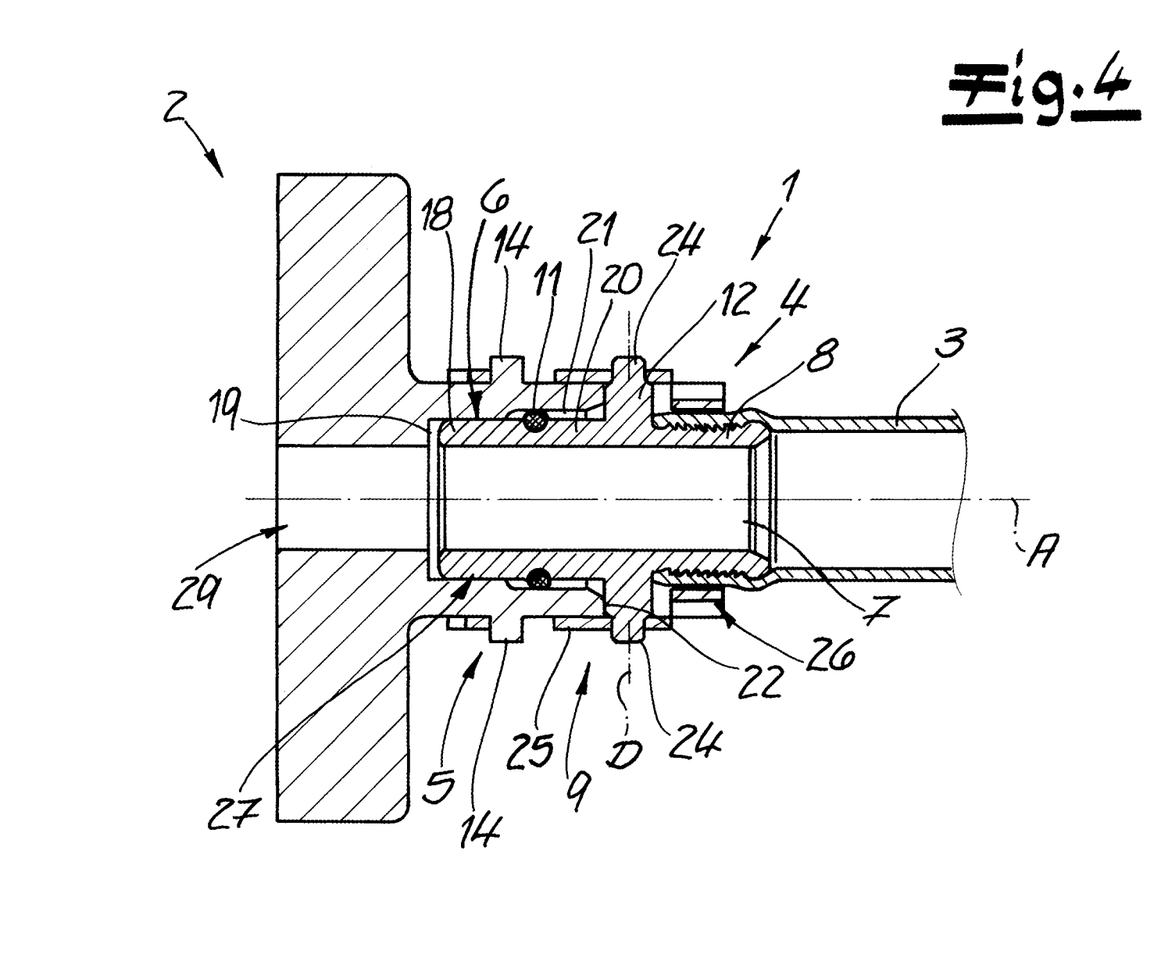
FIG. 4 is a longitudinal section of the exemplary embodiment from FIG. 3.
Figure 5A:
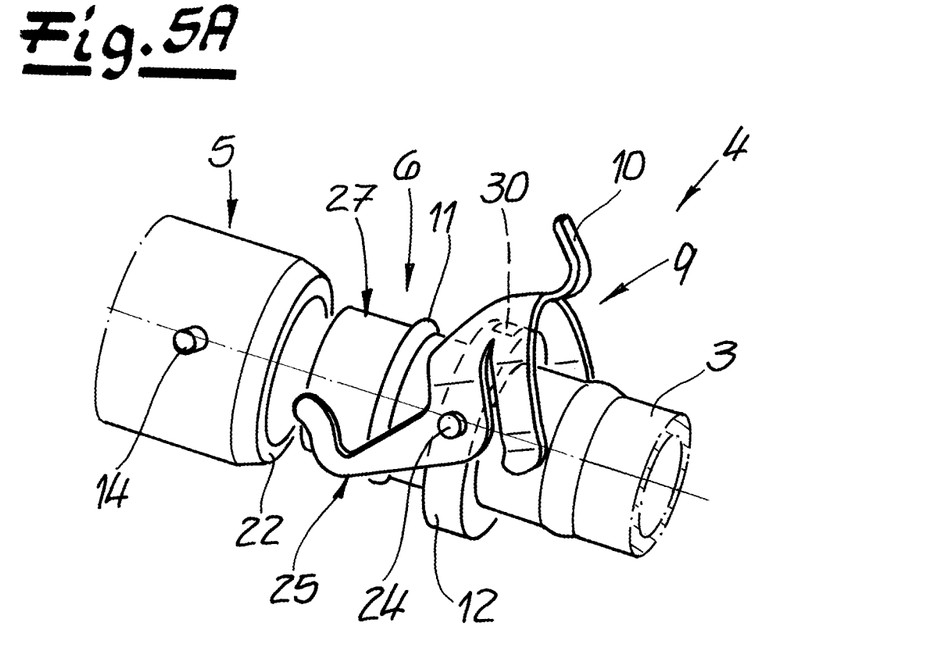
FIG. 5A is a cutout from FIG. 3.
Figure 5B:
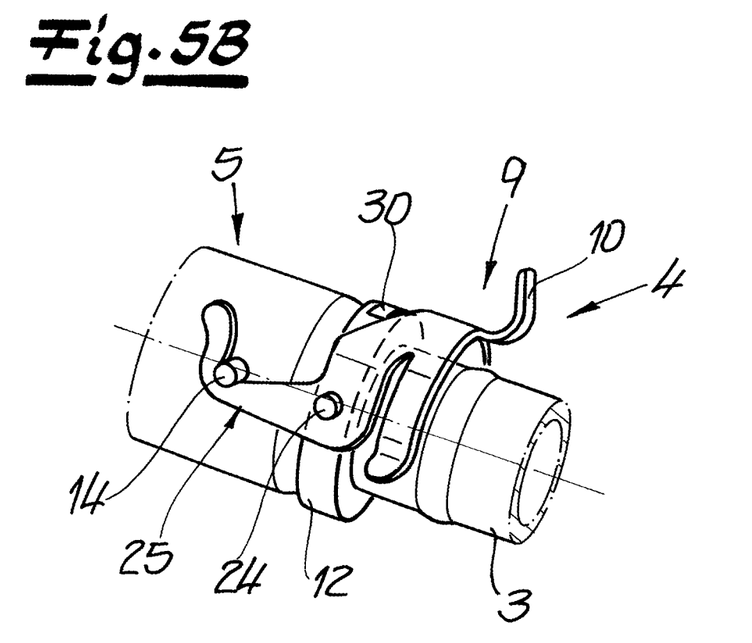
FIG. 5B is the exemplary embodiment from FIGS. 3 to 5A, but in a locked position.

As highlighted by the magnified view on FIG. 5A of the exemplary embodiment on FIGS. 3 and 4, a display symbol 30 can be arranged on the main body 6 or stop 12. The display symbol 30 of this exemplary embodiment is designed as a printed QR code, and is preferably completely covered by the locking element 9 in the open position. The locking element 9 is preferably designed in such a way as to uncover or make visible the display symbol 30 upon actuation of the actuating section 10, as discernible on FIG. 5B. The display symbol 30 thus performs a function entirely similar to that of the display element 13, but simplifies the ability to verify by machine whether the fluid connection 1, 2 or connector 4 or locking element 9 has assumed the locked position. The display symbol 30 is preferably arranged on the side of the main body 6 on which the actuating section 10 is also located. It is preferred that the display symbol 30 be arranged in the same half or in the same third/fourth of the scope of the connector 4 as the actuating section 10.

REFERENCE LIST

| | |
|---|---|
| 1 | Fluid line |
| 2 | Assembly |
| 3 | Tube |
| 4 | Connector |
| 5 | Coupling |
| 6 | Main body |
| 7 | Fluid channel |
| 8 | Connecting section |
| 9 | Locking element |
| 10 | Actuating section |
| 11 | Seal |
| 12 | Stop |
| 13 | Display element |
| 14 | Locking part |
| 15 | Locking point |
| 16 | Locking contour |
| 17 | Reinforcement |
| 18 | End section |
| 19 | End receptacle |
| 20 | Middle section |
| 21 | Sealing section |
| 22 | Front end |
| 23 | Shoulder |
| 24 | Swiveling pin |
| 25 | Swiveling arm |
| 26 | Latching leg |
| 27 | Connector shaft |
| 28 | Starting point |
| 29 | Connecting channel |
| 30 | Display symbol |
| A | Axis |
| D | Rotational axis |

The invention claimed is:

1. A fluid line for connection with an assembly or another fluid line of a motor vehicle, wherein the fluid line comprises:
   a tube; and
   at least one connector, wherein the connector is designed for insertion into a complementary coupling of the assembly or the other fluid line;
   wherein the connector has a main body, wherein the main body comprises a first end allocated to the coupling and a second end facing away from the first end, wherein the first end and second end are connected with each other by a fluid channel, wherein the fluid channel has an axis A and defines an axial and a radial direction, wherein the second end is a component part of a connecting section of the main body, wherein the connecting section is connected with the tube;
   wherein the connector comprises a locking element for locking with the coupling, wherein the locking element is mounted relative to the main body so that the locking element can rotate around a rotational axis D, wherein the connector and/or locking element is designed in such a way as to achieve a locking of the connector by rotating the locking element around the rotational axis D, wherein the locking element has at least one locking contour;
   wherein the rotational axis D is transverse to the axis A, and wherein the locking element includes a first arm and a first leg configured for rotation together, the first arm projecting from the rotational axis D towards the coupling and defining the locking contour, the first leg projecting from the rotational axis D towards the tube, wherein the connector has a locked configuration in which the locking contour of the first arm engages the coupling and the first leg abuts the tube to latch the tube to the main body;
   and wherein the locking element is configured such that a force acting axially on the connector can be exerted in the direction of the coupling by rotating the locking element during a locking process with a coupling.

2. The fluid line according to claim 1, wherein the locking contour defines a movable locking path for a rigid locking part of the coupling.

3. The fluid line according to claim 1, wherein the locking contour is designed in such a way that the necessary exertion of force while locking the locking element initially rises and then falls, so that locking process involves latching in the locking element.

4. The fluid line according to claim 1, wherein the connector and/or the locking element is designed in such a way that the connector is drawn in an axial direction toward the coupling during rotation in the locking process by at least 1 mm.

5. The fluid line according to claim 1, wherein the locking contour comprises at least one locking point, wherein the locking element is configured in such a way that the locking part is visible or completely visible in the locking point.

6. The fluid line according to claim 1, wherein the connector and/or locking element comprises a display element for displaying the complete locking process, wherein the display element comprises a stop of the locking contour and/or a display symbol.

7. The fluid line according to claim 1, wherein the locking element comprises an actuating section for performing the locking process.

8. The fluid line according to claim 1, wherein the connector or main body has a stop.

9. The fluid line according to claim 1, wherein the connector comprises a seal.

10. The fluid line according to claim 1, wherein an axial length of the locking element corresponds to at least 50% or 60% of the axial length of the main body.

11. The fluid line according to claim 1, wherein the axial expansion of a section of the main body insertable into the coupling corresponds to at least 20% or 30% or 40% of the entire axial length of the main body.

12. The fluid line according to claim 1, wherein the rotational axis D of the locking element in a top view of the connector runs at an inclination to axis A in a radial or essentially radial direction.

13. A fluid connection comprising a coupling and a fluid line according to claim 1, wherein the connector of the fluid line is configured for insertion into the coupling.

14. The fluid line according to claim 1, wherein the fluid line is a coolant circuit for a battery module of a motor vehicle.

15. The fluid line according to claim 8, wherein the stop is a flange.

16. The fluid line according to claim 1, wherein the first arm and first leg are rigidly connected together and unitarily formed as a single piece.

17. The fluid line according to claim 1, further comprising a second arm and a second leg, the first and second arms disposed on opposite sides of the axis A, the first and second legs disposed on oppposite sides of the axis A.

18. The fluid line according to claim 1, further comprising a second leg, the first and second leg being connected together to form U-shape that wraps around the tube in the locked configuration.

19. The fluid line according to claim 18, further comprising an actuating section connected to the U-shape of the first and second arms, the actuating section projecting from the U-shape and extending perpendicular to both axis A and rotational axis D in the locked configuration.

* * * * *